US007280847B2

United States Patent
Goldthwaite et al.

(10) Patent No.: US 7,280,847 B2
(45) Date of Patent: Oct. 9, 2007

(54) SYSTEM AND METHOD FOR MOBILE TRANSACTIONS USING THE BEARER INDEPENDENT PROTOCOL

(75) Inventors: Scott Goldthwaite, Hingham, MA (US); Andrew Petrov, Princeton, NJ (US); Andrei Doudkine, Salem, MA (US)

(73) Assignee: Way Systems Inc, Woburn, MA (US)

( * ) Notice: Subject to any disclaimer, the term of this patent is extended or adjusted under 35 U.S.C. 154(b) by 321 days.

(21) Appl. No.: 10/803,825

(22) Filed: Mar. 18, 2004

(65) Prior Publication Data
US 2004/0176134 A1 Sep. 9, 2004

Related U.S. Application Data

(63) Continuation-in-part of application No. 10/729,043, filed on Dec. 5, 2003, and a continuation-in-part of application No. 10/695,585, filed on Oct. 28, 2003, and a continuation-in-part of application No. 10/625,823, filed on Jul. 23, 2003, and a continuation-in-part of application No. 10/205,768, filed on Jul. 26, 2002.

(60) Provisional application No. 60/455,761, filed on Mar. 19, 2003.

(51) Int. Cl.
*H04Q 7/20* (2006.01)
*H04Q 7/32* (2006.01)

(52) U.S. Cl. .................. 455/558; 455/550.1; 455/410; 455/411; 455/412.1; 455/426.1; 455/575.1; 455/422.1; 379/433.01; 379/433.09; 370/310; 370/328; 370/329

(58) Field of Classification Search ................ 455/558, 455/550.1, 410, 411, 403, 422.1, 432.1, 435.1, 455/412.1, 412.2, 414.1, 426.1, 426.2, 41.2, 455/41.3, 500, 517, 557, 575.1, 90.3; 370/310, 370/328, 329, 343, 345; 379/433.01, 433.09
See application file for complete search history.

(56) References Cited

U.S. PATENT DOCUMENTS 6,292,561 B1 9/2001 Benson (Continued)

FOREIGN PATENT DOCUMENTS

WO WO99/66752 12/1999

OTHER PUBLICATIONS

ETSI TS 101 267 V 8.3.0 (GSM 11.14 version 8.3.0 Release 1999), ETSI, Sophia Antipolis Cedex-France.

*Primary Examiner*—Keith Ferguson
(74) *Attorney, Agent, or Firm*—AKC Patents LLC; Aliki K. Collins

(57) ABSTRACT

A system for performing mobile transactions includes a mobile communication device connecting to a server device via a first network. The mobile communication device includes a subscriber identification module (SIM) card slot and a virtual subscriber identification (VSIM) interface connected to the SIM card slot and it provides subscriber identity authentication to the server device via the VSIM interface. The mobile communication device further includes a mobile transaction client application for managing the communication between the mobile communication device and the server device. The mobile transaction client application manages the communication between the mobile device and the server device utilizing the Bearer Independent Protocol as defined in the European Telecommunications Standards Institute document ETSI TS 101 267 (3GPP TS 11.14).

38 Claims, 5 Drawing Sheets

U.S. PATENT DOCUMENTS

| | | | |
|---|---|---|---|
| 6,747,547 B2 * | 6/2004 | Benson | 340/10.4 |
| 2002/0103009 A1 * | 8/2002 | Sato | 455/558 |
| 2002/0196127 A1 | 12/2002 | Benson | |
| 2004/0131083 A1 * | 7/2004 | Arques et al. | 370/469 |
| 2004/0185888 A1 * | 9/2004 | Serge | 455/517 |
| 2005/0164739 A1 * | 7/2005 | Goldberg et al. | 455/558 |

* cited by examiner

ETSI TS 101 267 (3GPP TS 11.14)

Twelfth byte (Bearer Independent protocol proactive commands (class "e"):

ETSI TS 101 267 (3GPP TS 11.14)

Thirteenth byte (Bearer Independent protocol supported bearers (class "e"):

ETSI TS 101 267 (3GPP TS 11.14)

Seventeenth byte: (Bearer independent protocol supported transport interface) for class "e":

SYSTEM AND METHOD FOR MOBILE TRANSACTIONS USING THE BEARER INDEPENDENT PROTOCOL

CROSS REFERENCE TO RELATED CO-PENDING APPLICATIONS

This application claims the benefit of U.S. provisional application Ser. No. 60/455,761 filed on Mar. 19, 2003 and entitled SYSTEM AND METHOD FOR MOBILE TRANSACTIONS USING THE BEARER INDEPENDENT PROTOCOL which is commonly assigned and the contents of which are expressly incorporated herein by reference.

This application is also a continuation in part of U.S. application Ser. Nos. 10/205,768, 10/625,823, 10/695,585, and 10/729,043 filed on Jul. 26, 2002, Jul. 23, 2003, Oct. 28, 2003, and Dec. 5, 2003 and entitled "SYSTEM AND METHOD FOR PAYMENT TRANSACTION AUTHENTICATION", "MOBILE DEVICE EQUIPPED WITH A CONTACTLESS SMART CARD READER/WRITER", "MOBILE COMMUNICATION DEVICE EQUIPPED WITH A MAGNETIC STRIPE READER", and "SYSTEM AND METHOD FOR MOBILE PAYMENT AND FULFILLMENT OF DIGITAL GOODS" respectively, the contents of which applications are expressly incorporated herein by reference.

FIELD OF THE INVENTION

The present invention relates to a system and a method for performing transactions between a mobile device and a remote server utilizing the Bearer Independent Protocol commands.

BACKGROUND OF THE INVENTION

Mobile phones, originally designed for voice communication, are now extensively utilized for data transmission. The Short Message Service (SMS) protocol is the most widely used form of sending text messages between mobile phone users. SMS is also utilized for data communication between a server and a mobile phone. For example, in a simple "server-to-mobile" system, a server sends a mobile phone user an SMS message to notify him that he has voice mail or to send him information updates, i.e., news, weather and sports updates. More complex SMS applications enable the mobile phone user to send an SMS message to a designated server to request a stock quote, perform an inventory lookup or process a credit card transaction. SMS is a "store and forward" messaging protocol that ensures that a message reaches its intended destination. While this protocol is appropriate for sending text messages between two mobile phone users, it is not well suited for sending data and performing financial transactions between a mobile device and a host system for the following reasons.

- The European Telecommunications Standards Institute (ETSI) SMS specification (3GPP TS 23.040) defines the technical size limitation of an SMS message as 140 bytes. As a result, if the data transmission requires a larger size message, an application on the mobile device and the server must split up the message into smaller sizes and reassemble messages in the proper order.
- SMS messages have no context of a session, i.e., each SMS message is a distinct event. As a result, if a transaction requires multiple steps and therefore multiple SMS messages are needed to complete the transaction, the mobile device and server application must keep track of the transaction as it progresses through the various steps required to complete the transaction.
- Although SMS data can be encrypted "over the air" within a mobile operator's network, there is no specification for SMS data encryption once the message is transmitted beyond the mobile operator's network. For example, if the destination of the SMS message is a server inside a banking or enterprise network which is outside the mobile operator's network, the data will be unencrypted and vulnerable to interception by other unauthorized parties. As a result, the mobile device and server application must implement their own encryption method to ensure that the data in the SMS message are encrypted between the two endpoints.
- The "store and forward" nature of SMS provides reliability in getting a message transmitted. However, this also results in time delays between sender and recipient. This message latency is unpredictable and not suitable for conducting transactions where timing is important. For example, in financial transactions where customers and merchants expect instantaneous data transmission for payment authorization transactions, SMS message transmission that can average between 5 seconds to 60 seconds is not acceptable.

The implementation of packet-switch networks such as General Packet Radio Service (GPRS), DataTac, Mobitex provides an "always on" connection for data transmission that solves many of the problems associated with SMS data transmissions for transaction processing. GPRS also provides a direct gateway to the Internet, thereby enabling a mobile transaction system to directly interface between a mobile device and a server without utilizing SMS. Mobile devices can utilize GPRS networks in several ways:

- The mobile device can be directly connected to a computer using a serial cable, infrared or Bluetooth connection. When connected to the computer, the mobile device acts like a typical modem and an application on the computer can utilize Asynchronous Transfer Mode (ATM) commands to control the mobile device's connection to the GPRS network and establish a connection to the Internet. Once connected to the Internet, the computer can act as either a host/server or a client to create a mobile transaction processing system.
- The mobile device can also directly utilize a GPRS connection using a built-in or web/WAP browser to connect to a server application. Alternatively, the mobile device may enable developers to develop and deploy an application directly on the mobile device's operating system.
- On mobile devices that utilize a Subscriber Identification Card (SIM) card, applications on the SIM card can access control the GPRS connection utilizing SIM Toolkit (STK) commands as defined in the ETSI specification, ETSI TS 101 267 (3GPP TS 11.14). Using this connection, a web/WAP browser or an application on the SIM card can access data on a server and perform secure transaction processing.

Each of these methods enables a mobile financial transaction processing system depending on the type of application. The SIM card method is a more flexible solution because the SIM card can be placed into any mobile device that meets the 3GPP TS 11.14 (class e) specifications and the application will work the same way on any of these devices, whereas the other methods require custom programming for each type of mobile device. Although the SIM card approach provides greater flexibility, this approach is also more complex to develop because the SIM card is issued by the mobile network operator and only the mobile network operator can allow applications to be developed and deployed on the SIM card. As a result third party developers are not able to deploy applications without cooperating with the mobile network operator. Accordingly, there is a need for a system that allows third party developers to develop and deploy applications on the SIM card without the need for approval from the mobile network operator. Furthermore, the system needs to be able to transmit and receive data utilizing a standard communication protocol that will work the same way on any mobile device without the need for customization.

SUMMARY OF THE INVENTION

In general, one aspect of the invention provides a system for performing mobile transactions that includes a mobile communication device connected to a server device via a first network. The mobile communication device includes a subscriber identification module (SIM) card slot and a virtual subscriber identification (VSIM) interface connected to the SIM card slot and it provides subscriber identity authentication to the server device via the VSIM interface. The mobile communication device further includes a mobile transaction client application for managing communications between the mobile communication device and the server device. The mobile transaction client application manages the communication between the mobile device and the server device by utilizing SIM Application Toolkit (STK) commands to invoke the Bearer Independent Protocol described in the European Telecommunications Standards Institute document ETSI TS 101 267 (3GPP TS 11.14).

Implementations of this aspect of the invention include the following. The server device may further include a mobile transaction server application for managing the communication between the server and the mobile communication device. The VSIM interface may be located within the mobile communication device or within an attachment device. The attachment device may be connected to the mobile communication device via the SIM card slot and may further include one or more additional SIM slots, at least a second SIM card connected to one of the one or more additional SIM slots and a card reader. The card reader may be a smart card reader, a magnetic stripe card reader or a contactless smart card reader. The mobile communications device may be a mobile phone, a personal digital assistant, a pager, a wireless laptop computer, a personal computer, a television remote control or combinations thereof. The first network may be a wireless telecommunications network, a wireless wide area network (WWAN), a wireless local area network (WLAN), a wireless private network, or a wireless personal area network (PAN). The wireless telecommunications network may be a Global System for Mobile Communications (GSM), a Code Division Multiple Access (CDMA), CDMA 2000, wideband CDMA (WCDMA), Time Division Multiple Access (TDMA), General Packet Radio Service (GPRS), Third Generation (3G), Enhanced Data GSM Environment (EDGE), Mobitex or DataTac. The first network may also be infrared, serial line or Bluetooth. The first network may connect to a second network through a mobile operator gate and the server may connect to the second network thereby connecting to the first network and the mobile communication device. The second network may be the Internet, a wireless network, a wired network, a telecommunications network, a local area network (LAN), a WWAN, WLAN, or a personal area network (PAN). The communication may have a format such as Short Message Service (SMS), Transmission Control Protocol/Internet Protocol (TCP/IP), User Datagram Protocol (UPD), Simple Mail Transmission Protocol (SMTP), Simple Network Management Protocol (SNMP), or a proprietary message format. The server device may be further connected to other server devices via the second network. The mobile transactions may be financial transactions, information exchange or digital goods exchange. The server device may be a server computer, a personal computer, a second mobile communication device, a printer, or another communication device. The mobile communication device may further include a memory, a Central Processing Unit (CPU) and a first SIM card connected to the SIM card slot where the first SIM card authenticates the mobile communication device to the first network. The mobile communications device may further include other interfaces connected to the CPU. These other interfaces may be smart card interfaces, infrared transceiver interfaces, serial communication interfaces, or magnetic stripe reader interfaces. The mobile transaction client application may be stored in the VSIM interface, the CPU, the second SIM card, an external SIM card, a contactless smart card, a magnetic stripe card, or an external card.

In general in another aspect the invention provides a method for performing mobile transactions including the following steps. First providing a mobile communication device having a subscriber identification module (SIM) card slot and a virtual subscriber identification (VSIM) interface connected to the SIM card slot. Next, providing a server device and connecting the mobile communication device to the server device via a first network. Next, providing subscriber identity authentication of the mobile communication device to the server device via the VSIM interface and communicating between the mobile communication device and the server device for performing mobile transactions. The mobile communication device further includes a mobile transaction client application for managing the communication between the mobile communication device and the server device. The mobile transaction client application manages the communication between the mobile device and the server device by utilizing SIM Application Toolkit (STK) commands to invoke the Bearer Independent Protocol described in the European Telecommunications Standards Institute document ETSI TS 101 267 (3 GPP TS 11.14).

Among the advantages of this invention may be one or more of the following. This invention provides an alternative and convenient way to develop and deploy mobile transaction processing systems. The advantage of using a mobile device attachment to interface with the mobile device at the SIM slot is application portability. The SIM Toolkit (STK) interface supported by the mobile device is a standard that is implemented identically on any mobile device that supports the standard. Therefore, any mobile transaction system that utilizes the STK specification will work on any mobile device that supports the standard regardless of the mobile device's hardware, software or firmware. Additionally, the approach of utilizing a VSIM interface enables the mobile device to access customized applications when the mobile device may otherwise be unable to be programmed with custom applications.

DETAILED DESCRIPTION OF THE INVENTION

The present invention describes a system and method for processing mobile transactions. The system includes one or more mobile devices exchanging data with one or more remote servers or devices. The system utilizes a SIM Application Toolkit (STK) commands in order to establish a communication link between the one or more mobile devices and the one or more remote servers or devices.

Figure 1:
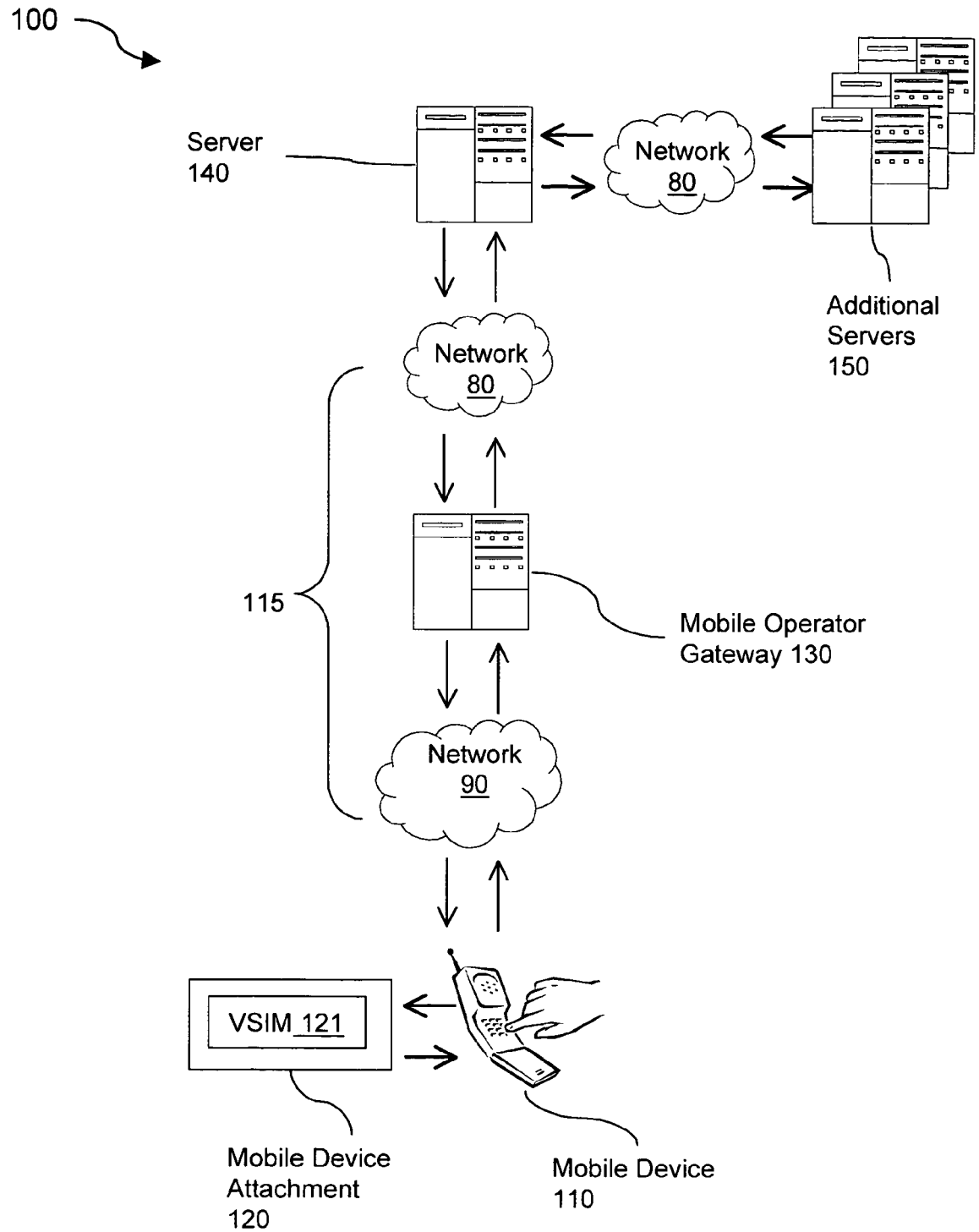
FIG. 1 is schematic diagram of a mobile transaction system according to this invention.
Figure 2:
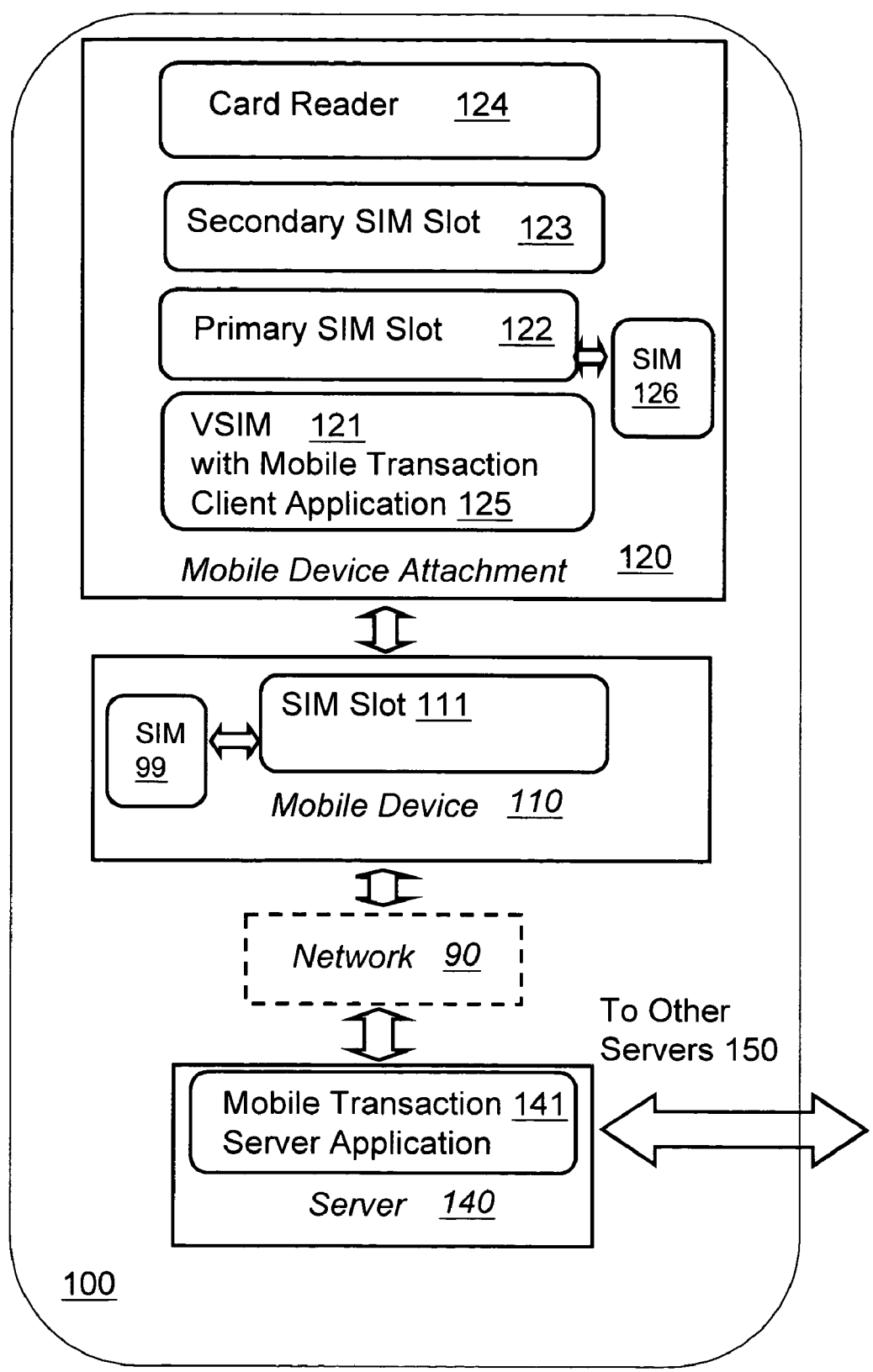
FIG. 2 is a block diagram of the system architecture the mobile transaction system of FIG. 1.

Referring to FIG. 1 and FIG. 2, a mobile transaction system 100 includes a mobile device 110, a mobile device attachment 120, a server 140 and additional servers 150. The mobile device 110 accesses the server 140 via a network connection 115 that includes a first network 90, a mobile operator gateway 130, and a second network 80. The mobile device 110 includes a Subscriber Identification Module (SIM) card 99 and a SIM slot 111. The mobile device attachment 120 connects to the mobile device 110 by attaching to the mobile device SIM slot 111.

Referring to FIG. 2, the mobile device attachment 120 includes a Virtual Subscriber Identification Module (VSIM) interface 121, a primary SIM slot 122, a secondary SIM slot 123, a card reader 124 and a SIM 126 placed in the primary SIM slot 122. The VSIM 121 includes a mobile transaction client application 125 that manages the interaction between the mobile device 110, the SIM 126 and a plurality of Smart Cards attached to SIM slots 122, 123 or to the card reader 124. The mobile transaction client application 125 utilizes the Bearer Independent Protocol (BIP) to open a communication channel to the mobile device 110 and to transmit and receive data to server 140. In this embodiment the mobile transaction client application 125 resides within VSIM 121. In other embodiments the mobile transaction client application 125 may reside within any of the smart cards attached to slots 122, 123 or within an external smart card that can be accessed via the card reader 124. Server 140 includes a mobile transaction server application 141 that transmits and receives data to and from the mobile transaction client application 125, respectively, using the communication channel established by the mobile transaction client application 125. The data that are transmitted between the mobile transaction client application 125 and mobile transaction server application 141 may be encrypted. In one example, the card reader 124 is a full-size ISO 78.16 smart card reader. In other examples, the card reader 124 is a contactless card reader or a magnetic stripe card reader, as described in the co-pending patent applications entitled "Mobile Device Equipped with a Contactless Smart Card Reader", and "Mobile Communication Device Equipped with a Magnetic Stripe Reader", respectively, the entire contents of which are incorporated herein by reference.

Figure 5:
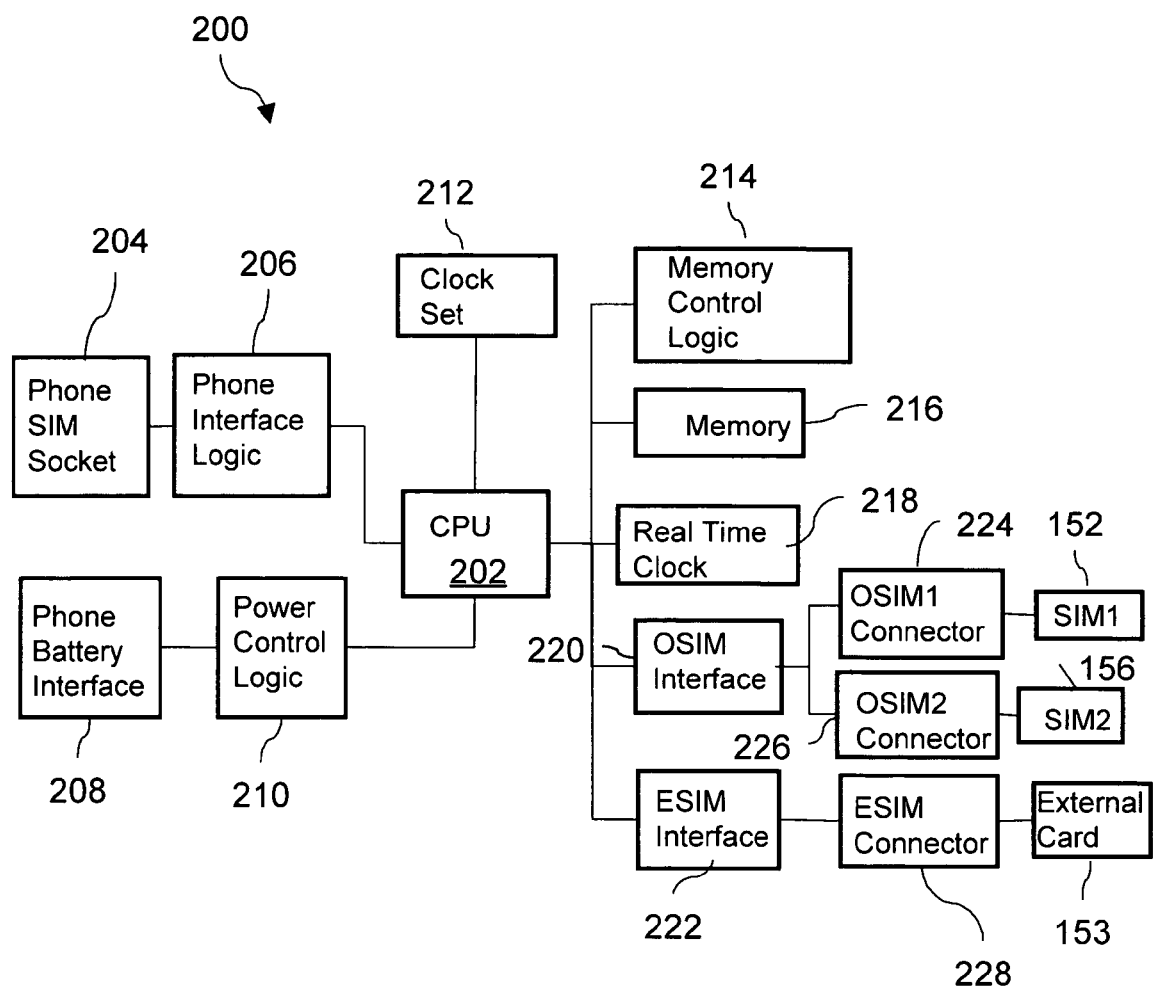
FIG. 5 illustrates a circuitry for a mobile device attachment that adds multiple smart cards to a mobile device via a connection to the SIM slot on the mobile device.

The SIM card 99 is issued by the mobile network operator and usually only the mobile network operator controls the development and deployment of applications on the SIM card 99. Third party application developers need to cooperate with the mobile network operator in order to develop and deploy applications on the SIM card 99. To alleviate the problem of developing SIM applications without obtaining cooperation from the mobile network operator or SIM card issuer, the invention described in PCT application WO 99/66752 entitled "Communication Method and Apparatus Improvement", the entire content of which is incorporated herein by reference, describes an attachment that connects to a mobile device SIM slot and provides an interface to the mobile device. Referring to FIG. 5, a schematic block diagram of the mobile device circuitry 200 includes a central processing unit (CPU) 202, which is connected through a phone interface logic arrangement 206 to a phone Subscriber Identification Module (SIM) socket 204. The CPU 202 has a clock arrangement 212 and power controller logic 210, which connects, to a phone battery interface 208. The CPU 202 has a memory 216, memory control logic 214, and a real time clock 218. The CPU 202 is also connected to an original subscriber identification module (OSIM) interface 220, and an external subscriber identification module (ESIM) interface 222. The OSIM interface 220 includes a first OSIM1 connector 224 and a second OSIM2 connector 226. OSIM1 connector 220 connects to a SIM 1 card 152 and OSIM 2 connector connects to SIM 2 card 156. The ESIM interface 222 includes an ESIM connector 228 that connects to an external card reader 153. In addition to the external card reader, "contactless" smart card reader and/or a magnetic stripe card reader can connect to the CPU 202, as described in the co-pending patent applications entitled "Mobile Device Equipped with a Contactless Smart Card Reader", and "Mobile Communication Device Equipped with a Magnetic Stripe Reader", respectively, the entire contents of which are incorporated herein by reference. The memory 216 and memory control logic 214 function so as to provide a Virtual SIM (VSIM) interface that allows data communication between the phone and the SIM card within the VSIM interface and manages the communication between the phone and applications within the VSIM interface and/or applications stored in any of the other cards that are in connection with the VSIM interface.

Figure 4A:
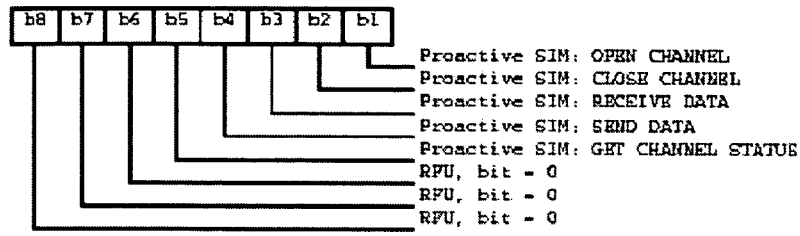
FIG. 4A is the ETSI specification for the Bearer Independent Protocol supported proactive commands.
Figure 4B:
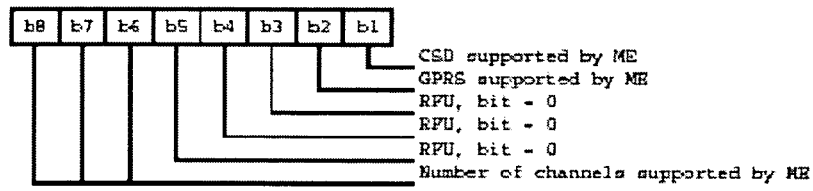
FIG. 4B is the ETSI specification for the Bearer Independent Protocol supported bearers.
Figure 4C:
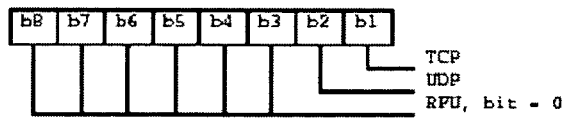
FIG. 4C is the ETSI specification for the Bearer Independent Protocol supported transport interfaces.

As was mentioned above, the mobile transaction client application 125 utilizes the Bearer Independent Protocol (BIP) to open a communication channel to the mobile device 110 and to transmit and receive data to server 140. The BIP is a signaling protocol specified by the European Telecommunications Standards Institute (ETSI) in a document entitled "ETSI TS 101 267 (3GPP TS 11.14)". To initiate a mobile transaction, the mobile transaction client application 125 queries the profile of the mobile device 110 to obtain information on support for BIP commands, available BIP channels and available BIP transport interfaces. FIG. 4A, FIG. 4B, and FIG. 4C depict the BIP proactive commands, supported bearers, and supported transport interfaces, respectively. The BIB proactive commands include OPEN CHANNEL, CLOSE CHANNEL, RECEIVE DATA, SEND DATA, and GET CHANNEL STATUS. The supported bearers include Circuit Switched Data (CSD) and GPRS. The supported transport interfaces include Transmission Control protocol (TCP), User Datagram Protocol (UDP), and Reserved for Future Use (RFU). The mobile transaction client application 125 opens the appropriate channel using the appropriate transport interface and transmits data to a mobile transaction server application 141 residing within the server 140. The initiation of a mobile transaction can be triggered by user selection on the mobile device 110, by an event occurring on a mobile transaction server application 141 or automatically by an event occurring on a mobile transaction client application 125. The server 140 also connects to other servers 150 via the second network 80 and the mobile transaction server application 141 transmits data to the additional servers 150.

In one example, the first network 90 is a wireless telecommunication network such GSM, GPRS, 3G, EDGE, CDMA, TDMA, WCDMA, Mobitex, or DataTac. In other examples first network 90 is a wireless local area network (WLAN) (i.e., 802.11x), a wireless personal area network (WPAN), a wired telecommunications network, a local area network (LAN), a personal area network (PAN) (i.e., Bluetooth, Infrared), or a direct serial line connection to server 140. In one example, the second network 80 is the Internet. In other examples, the second network 80 is a wired or a wireless telecommunication network, a local area network (LAN), a wireless wide area network (WWAN), a wireless local area network (WLAN), or a personal area network (PAN). Mobile Operator Gateway 130 is a routing server utilized by the mobile operator to connect the mobile operator's private network to the public Internet, thereby enabling the mobile device 110 to access nodes, servers and/or resources on the Internet.

Figure 3:
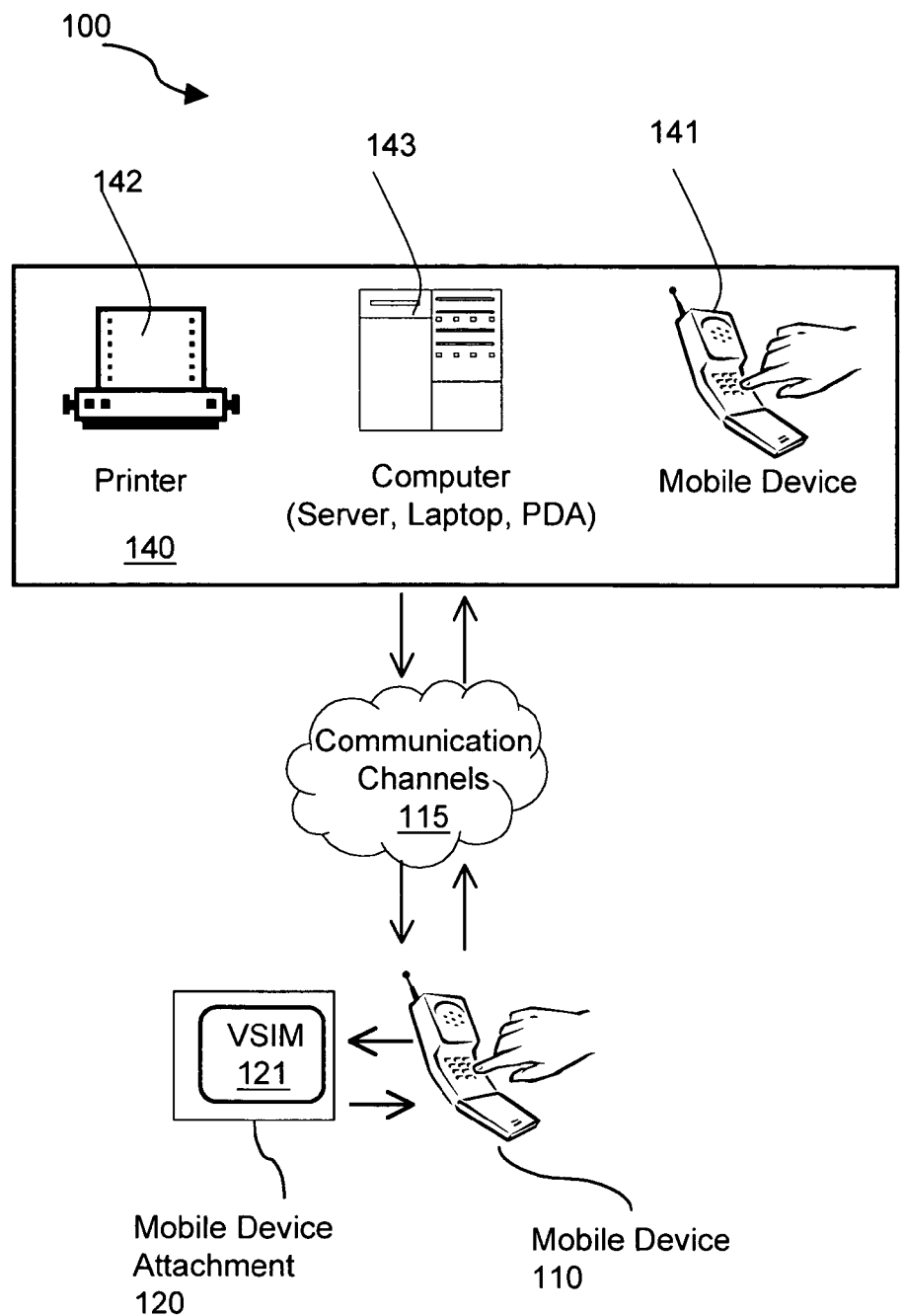
FIG. 3 is another embodiment of the mobile transaction system according to this invention.

Referring to FIG. 3, in other embodiments, the remote server 140 is another type of remote or local device such as a printer 142, a personal computer 143 or another mobile phone 141. In these embodiments the mobile device 110 supports the appropriate channels 115 to establish a connection with these types of remote or local devices. Examples of appropriate communication channels 115 include Infrared, Bluetooth, direct serial line connection, WLAN, LAN, GPRS, and PAN. In one example, the mobile transaction system 100 utilizes the Infrared, Bluetooth or serial connection of the mobile device 110 to send data to a printer 142 to print out a sales receipt. In another example the mobile transaction system 100 utilizes the Infrared, Bluetooth or serial connections of the mobile device 110 to connect to a server 140 and/or 150. In another example the mobile transaction system 100 utilizes the Infrared, Bluetooth or serial connections of the mobile device 110 to connect to an additional mobile devices 141 for data exchange.

In one embodiment, the mobile transaction system 100 is used for processing mobile payments, such as credit card transactions through the mobile device 110. In this embodiment the server 140 is a payment transaction server and the other servers 150 are payment processors and/or a payment gateway. In another embodiment, the mobile transaction system 100 is utilized for downloading "digital goods" from servers 140, 150 to mobile device 110 and/or to mobile device attachment 120 and to payment cards or smart cards that can connect to the mobile device 110 or the mobile device attachment 120. Examples of "digital goods" include electronic cash (e-Cash), electronic tickets (e-Tickets), electronic coupons (e-Coupons), loyalty points (i.e. frequent flyer miles, frequent shopper points), credits for pre-paid mobile airtime, credits for pre-paid utilities, and digital rights management (DRM) certificates for accessing multimedia applications from servers 140,150 to mobile device 110 and/or to the mobile device attachment 120 and payment card and/or smart card (not shown) in connection with mobile device 110 and/or mobile device attachment 120. This application is described in a co-pending patent application entitled "System And Method For Mobile Payment And Fulfillment Of Digital Goods", the entire content of which is incorporated herein by reference.

Several embodiments of the present invention have been described. Nevertheless, it will be understood that various modifications may be made without departing from the spirit and scope of the invention. Accordingly, other embodiments are within the scope of the following claims.

What is claimed is:

1. A system for performing mobile transactions comprising:
   a mobile communication device comprising a subscriber identification module (SIM) card slot, a virtual subscriber identification (VSIM) interface connected to said SIM card slot and a mobile transaction client application;
   a server device; and
   wherein said mobile communication device is adapted to connect to said server device via a first network, to provides subscriber identity authentication to said server device via said VSIM, and to manage communication to said server device with said mobile transaction client application, wherein said mobile transaction client application utilizes SIM Application Toolkit commands to invoke the Bearer Independent Protocol described in the European Telecommunications Standards Institute document ETSI TS 101 267 (3GPP TS 11.14).

2. The system of claim 1 wherein said VSIM interface is located within said mobile communication device.

3. The system of claim 1 wherein said VSIM interface is located within an attachment device and said attachment device is connected to said SIM card slot of said mobile communication device.

4. The system of claim 3 wherein said attachment device further comprises one or more additional SIM slots, a second SIM card connected to one of said one or more additional SIM slots and a card reader.

5. The system of claim 1 wherein said mobile communications device is selected from a group consisting of a mobile phone, a personal digital assistant, a pager, a wireless laptop computer, a personal computer, a television remote control and combinations thereof.

6. The system of claim 1 wherein said first network comprises a wireless network selected from a group consisting of wireless telecommunications network, a wireless wide area network (WWAN), a wireless local area network (WLAN), a wireless private network, and a wireless personal area network (PAN).

7. The system of claim 6 wherein said wireless telecommunications network is selected from a group consisting of a Global System for Mobile Communications (GSM), a Code Division Multiple Access (CDMA), CDMA 2000, wideband CDMA (WCDMA), TDMA, General Packet Radio Service (GPRS), 3G, EDGE, Mobitex and DataTac.

8. The system of claim 1 wherein said first network is selected from a group consisting of infrared, serial line and Bluetooth.

9. The system of claim 1 wherein said first network is adapted to connect to a second network through a mobile operator gate and wherein said server is adapted to connect to said second network thereby connecting to said first network and said mobile communication device.

10. The system of claim 9 wherein said second network is selected from a group consisting of the Internet, a wireless network, a wired network, a telecommunications network, a local area network (LAN), a WWAN, WLAN, and a personal area network (PAN).

11. The system of claim 9 wherein said server device is further connected to other server devices via said second network.

12. The system of claim 1 wherein said communication comprises a format selected from a group consisting of Short Message Service (SMS), Transmission Control Protocol/Internet Protocol (TCP/IP), User Datagram Protocol (UPD), Simple Mail Transmission Protocol (SMTP), Simple Network Management Protocol (SNMP), and a proprietary message format.

13. The system of claim 1 wherein said mobile transactions are selected from a group consisting of financial transactions, information exchange transactions and digital goods exchange transactions.

14. The system of claim 1 wherein said server device is selected from a group consisting of a server computer, a personal computer, a second mobile communication device, a printer, and another communication device.

15. The system of claim 1 wherein said mobile communication device further comprises:
 a memory;
 a Central Processing Unit (CPU); and
 a first SIM card connected to said SIM card slot, said first SIM card authenticating said mobile communication device to said first network.

16. The system of claim 15 wherein said mobile communications device further comprises other interfaces connected to said CPU.

17. The system of claim 16 wherein said other interfaces are selected from a group consisting of smart card interfaces, infrared transceiver interfaces, serial communication interfaces, and magnetic stripe reader interfaces.

18. The system of claim 15 wherein said mobile transaction client application is stored in storage selected from a group consisting of said VSIM interface, said CPU, an additional SIM card, an external SIM card, a contactless smart card, and an external card.

19. The system of claim 1 wherein said server device further comprises a mobile transaction server application for managing communication between said server and said mobile communication device.

20. A method for performing mobile transactions comprising:
 providing a mobile communication device comprising a subscriber identification module (SIM) card slot, a virtual subscriber identification (VSIM) interface connected to said SIM card slot and a mobile transaction client application;
 providing a server device;
 connecting said mobile communication device to said server device via a first network;
 providing subscriber identity authentication of said mobile communication device to said server device via said VSIM interface; and
 communicating between said mobile communication device and said server device, wherein said mobile communication device manages said communication with said mobile transaction client application, by utilizing SIM Application Toolkit commands to invoke the Bearer Independent Protocol described in the European Telecommunications Standards Institute document ETSI TS 101 267 (3GPP TS 11.14).

21. The method of claim 20 wherein said VSIM interface is located within said mobile communication device.

22. The method of claim 20 wherein said VSIM interface is located within an attachment device and said attachment device is connected to said SIM card slot of said mobile communication device.

23. The method of claim 22 wherein said attachment device further comprises one or more additional SIM slots, a second SIM card connected to one of said one or more additional SIM slots, and an external card reader.

24. The method of claim 20 wherein said mobile communications device is selected from a group consisting of a mobile phone, a personal digital assistant, a pager, a wireless laptop computer, a personal computer, a television remote control and combinations thereof.

25. The method of claim 20 wherein said first network comprises a wireless network selected from a group consisting of wireless telecommunications network, a wireless wide area network (WWAN), a wireless local area network (WLAN), a wireless private network, and a wireless personal area network (PAN).

26. The method of claim 25 wherein said wireless telecommunications network is selected from a group consisting of a Global System for Mobile Communications (GSM), a Code Division Multiple Access (CDMA), CDMA 2000, wideband CDMA (WCDMA), TDMA, General Packet Radio Service (GPRS), 3G, EDGE, Mobitex and DataTac.

27. The method of claim 20 wherein said first network is selected from a group consisting of infrared, serial line and Bluetooth.

28. The method of claim 20 wherein said first network is adapted to connect to a second network through a mobile operator gate and wherein said server is adapted to connect to said second network thereby connecting to said first network and said mobile communication device.

29. The method of claim 28 wherein said second network is selected from a group consisting of the Internet, a wireless network, a wired network, a telecommunications network, a local area network (LAN), a WWAN, WLAN, and a personal area network (PAN).

30. The method of claim 28 further comprising connecting said server device to other server devices via said second network.

31. The method of claim 20 wherein said communication comprises a format selected from a group consisting of Short Message Service (SMS), Transmission Control Protocol/Internet Protocol (TCP/IP), User Datagram Protocol (UPD), Simple Mail Transmission Protocol (SMTP), Simple Network Management Protocol (SNMP), and a proprietary message format.

32. The method of claim 20 wherein said mobile transactions are selected from a group consisting of financial transactions, information exchange transactions and digital goods exchange transactions.

33. The method of claim 20 wherein said server device is selected from a group consisting of a server computer, a personal computer, a second mobile communication device, a printer, and another communication device.

34. The method of claim 20 wherein said mobile communication device further comprises:
 a memory;
 a Central Processing Unit (CPU); and
 a first SIM card connected to said SIM card slot, said first SIM card authenticating said mobile communication device to said first network.

35. The method of claim 34 wherein said mobile communications device further comprises other interfaces connected to said CPU.

36. The method of claim 35 wherein said other interfaces are selected from a group consisting of smart card interfaces, infrared transceiver interfaces, serial communication interfaces, and magnetic stripe reader interfaces.

37. The method of claim 34 wherein said mobile transaction client application is stored in storage selected from a group consisting of said VSIM interface, said CPU, an additional SIM card, an external SIM card, a contactless smart card, and an external card.

38. The method of claim 20 wherein said server device further comprises a mobile transaction server application for managing communication between said server and said mobile communication device.

* * * * *